(12) United States Patent
Zalusky

(10) Patent No.: US 8,345,255 B2
(45) Date of Patent: Jan. 1, 2013

(54) SOLAR CONCENTRATOR TESTING

(75) Inventor: James Thomas Zalusky, Beavercreek, OH (US)

(73) Assignee: MH Solar Co., Ltd., Taipei (TW)

( * ) Notice: Subject to any disclaimer, the term of this patent is extended or adjusted under 35 U.S.C. 154(b) by 615 days.

(21) Appl. No.: 12/496,150

(22) Filed: Jul. 1, 2009

(65) Prior Publication Data
US 2010/0002237 A1   Jan. 7, 2010

Related U.S. Application Data (60) Provisional application No. 61/078,038, filed on Jul. 3, 2008.

(51) Int. Cl.
*G01N 21/55* (2006.01)
*G01B 9/00* (2006.01)
*G01B 11/26* (2006.01)
*G01B 11/24* (2006.01)
*G01B 11/14* (2006.01)

(52) U.S. Cl. ........ 356/448; 356/124; 356/138; 356/601; 356/614

(58) Field of Classification Search .................. None
See application file for complete search history.

(56) References Cited

U.S. PATENT DOCUMENTS

| | | |
|---|---|---|
| 3,696,286 A | 10/1972 | Ule |
| 3,797,476 A | 3/1974 | Tarcici |
| 3,985,579 A | 10/1976 | Rahilly |
| 4,041,307 A | 8/1977 | Napoli et al. |
| 4,090,070 A | 5/1978 | Colomes |
| 4,098,264 A | 7/1978 | Brokaw |
| 4,154,219 A | 5/1979 | Gupta et al. |
| 4,178,913 A | 12/1979 | Hutchison |
| 4,202,321 A | 5/1980 | Volna |
| 4,219,729 A | 8/1980 | Smith |
| 4,223,214 A | 9/1980 | Dorian et al. |
| 4,248,643 A | 2/1981 | Peters |
| 4,249,514 A | 2/1981 | Jones |
| 4,262,195 A | 4/1981 | White et al. |
| 4,296,731 A | 10/1981 | Cluff |
| 4,315,163 A | 2/1982 | Bienville |
| 4,328,789 A | 5/1982 | Nelson |
| 4,354,484 A | 10/1982 | Malone et al. |
| 4,364,183 A | 12/1982 | Rhodes |

(Continued)

FOREIGN PATENT DOCUMENTS

CA   1 132 869   10/1982
(Continued)

OTHER PUBLICATIONS

OA dated Apr. 28, 2011 for U.S. Appl. No. 12/495,164, 33 pages.
(Continued)

*Primary Examiner* — Gordon Stock, Jr.
(74) *Attorney, Agent, or Firm* — Turocy & Watson, LLP (57) ABSTRACT

A system (and corresponding methodology) for testing, evaluating and diagnosing quality of solar concentrator optics is provided. The innovation discloses mechanisms for evaluating the performance and quality of a solar collector via emission of modulated laser radiation upon (or near) a position of photovoltaic (PV) cells. The innovation discloses positioning two receivers at two distances from the source (e.g., solar collector or dish). These receivers are employed to collect modulated light which can be compared to standards or other thresholds thereby diagnosing quality of the collectors.

21 Claims, 4 Drawing Sheets

U.S. PATENT DOCUMENTS

| | | | |
|---|---|---|---|
| 4,392,008 | A | 7/1983 | Cullis |
| 4,409,422 | A | 10/1983 | Sater |
| 4,445,030 | A | 4/1984 | Carlton |
| 4,496,787 | A | 1/1985 | Touchais et al. |
| 4,501,469 | A | 2/1985 | Merges et al. |
| 4,516,314 | A | 5/1985 | Sater |
| 4,546,756 | A | 10/1985 | Leroy et al. |
| 4,583,520 | A | 4/1986 | Dietrich et al. |
| 4,656,996 | A | 4/1987 | Aharon |
| 4,691,106 | A * | 9/1987 | Hyun et al. ............. 250/349 |
| 4,720,170 | A | 1/1988 | Learn, Jr. |
| 4,771,764 | A | 9/1988 | Cluff |
| 4,836,672 | A | 6/1989 | Naiman et al. |
| 5,022,929 | A | 6/1991 | Gallois-Montbrun |
| 5,125,743 | A | 6/1992 | Rust et al. |
| 5,187,361 | A | 2/1993 | Ishii, et al. |
| 5,223,043 | A | 6/1993 | Olson et al. |
| 5,293,447 | A | 3/1994 | Fanney et al. |
| 5,374,939 | A | 12/1994 | Pullen |
| 5,473,166 | A | 12/1995 | Imai et al. |
| 5,522,944 | A | 6/1996 | Elazari |
| 5,578,140 | A * | 11/1996 | Yogev et al. ............. 136/246 |
| 5,616,913 | A | 4/1997 | Litterst |
| 5,707,458 | A | 1/1998 | Nagashima et al. |
| 5,758,938 | A | 6/1998 | Osterwisch |
| 5,798,517 | A | 8/1998 | Berger |
| 5,859,783 | A * | 1/1999 | Ytterberg et al. ............ 702/54 |
| 5,862,799 | A | 1/1999 | Yogev et al. |
| 5,899,071 | A | 5/1999 | Stone et al. |
| 5,964,216 | A | 10/1999 | Hoffschmidt et al. |
| 5,982,481 | A | 11/1999 | Stone et al. |
| 6,018,122 | A | 1/2000 | Hibino et al. |
| 6,018,123 | A | 1/2000 | Takada |
| 6,080,927 | A | 6/2000 | Johnson |
| 6,123,067 | A | 9/2000 | Warrick |
| 6,127,620 | A | 10/2000 | Tange et al. |
| 6,281,426 | B1 | 8/2001 | Olson et al. |
| 6,284,968 | B1 | 9/2001 | Niesyn |
| 6,485,152 | B2 | 11/2002 | Wood |
| 6,597,709 | B1 | 7/2003 | Diver, Jr. |
| 6,662,801 | B2 | 12/2003 | Hayden |
| 6,704,607 | B2 | 3/2004 | Stone et al. |
| 6,848,442 | B2 | 2/2005 | Haber |
| 6,936,760 | B2 | 8/2005 | Rogers et al. |
| 6,984,050 | B2 | 1/2006 | Nakamura |
| 7,076,965 | B2 | 7/2006 | Lasich |
| 7,079,317 | B2 | 7/2006 | Baun et al. |
| 7,092,156 | B2 | 8/2006 | Baun et al. |
| 7,109,461 | B2 | 9/2006 | Lasich |
| 7,185,845 | B1 | 3/2007 | Hartman et al. |
| 7,197,829 | B2 | 4/2007 | Acres |
| 7,253,902 | B2 | 8/2007 | Feldman |
| 7,357,132 | B2 | 4/2008 | Hayden |
| 7,667,833 | B1 * | 2/2010 | Diver ............. 356/138 |
| 7,709,730 | B2 | 5/2010 | Johnson et al. |
| 7,825,327 | B2 | 11/2010 | Johnson et al. |
| 7,834,303 | B2 | 11/2010 | Fatehi et al. |
| 7,873,490 | B2 | 1/2011 | MacDonald |
| 2002/0179138 | A1 | 12/2002 | Lawheed |
| 2003/0045949 | A1 | 3/2003 | Stone et al. |
| 2004/0216777 | A1 | 11/2004 | Pan |
| 2005/0016581 | A1 | 1/2005 | Fujisaki et al. |
| 2005/0109387 | A1 | 5/2005 | Marshall |
| 2007/0034205 | A1 | 2/2007 | Watts |
| 2007/0089774 | A1 | 4/2007 | Lasich |
| 2007/0095341 | A1 | 5/2007 | Kaneff |
| 2007/0145252 | A1 | 6/2007 | Litchfield et al. |
| 2007/0150198 | A1 | 6/2007 | MacDonald |
| 2007/0151245 | A1 | 7/2007 | Coffey et al. |
| 2007/0215198 | A1 | 9/2007 | Jiang et al. |
| 2007/0227574 | A1 | 10/2007 | Cart |
| 2007/0251564 | A1 | 11/2007 | Smith |
| 2007/0251569 | A1 | 11/2007 | Shan et al. |
| 2008/0011288 | A1 | 1/2008 | Olsson |
| 2008/0017784 | A1 | 1/2008 | Hoot et al. |
| 2008/0040990 | A1 | 2/2008 | Vendig et al. |
| 2008/0087318 | A1 | 4/2008 | Jwo |
| 2008/0128559 | A1 | 6/2008 | Ho et al. |
| 2008/0236568 | A1 * | 10/2008 | Hickerson et al. ............ 126/578 |
| 2009/0056699 | A1 | 3/2009 | Mills et al. |
| 2009/0114211 | A1 | 5/2009 | Homyk et al. |
| 2009/0126774 | A1 | 5/2009 | Taylor, II et al. |
| 2009/0205637 | A1 | 8/2009 | Moore et al. |
| 2009/0293293 | A1 * | 12/2009 | Lawrence et al. ............... 33/343 |
| 2009/0293861 | A1 | 12/2009 | Taylor et al. |
| 2010/0000519 | A1 | 1/2010 | Zalusky et al. |
| 2010/0000522 | A1 | 1/2010 | Zahuranec |
| 2010/0006139 | A1 | 1/2010 | Zahuranec et al. |
| 2010/0263659 | A9 | 10/2010 | Taylor et al. |
| 2011/0048403 | A1 | 3/2011 | Stavrou et al. |

FOREIGN PATENT DOCUMENTS

| | | | |
|---|---|---|---|
| CN | 101093114 A | | 12/2007 |
| EP | 1919029 | | 5/2008 |
| ES | 2114826 A1 * | | 6/1998 |
| GB | 2426324 | | 11/2006 |
| JP | 62 166 110 | | 7/1987 |
| JP | 63096447 A | | 4/1988 |
| JP | 7 038 131 A | | 2/1995 |
| JP | 8 130 322 | | 5/1996 |
| JP | 200153322 | | 2/2001 |
| JP | 2004-312054 A | | 11/2004 |
| JP | 2005018352 A | | 1/2005 |
| JP | 2005 038 270 | | 2/2005 |
| KR | 100343263 B1 | | 6/2002 |
| WO | 2008003023 | | 1/2008 |
| WO | 2008013976 A2 | | 1/2008 |
| WO | 2008117297 A2 | | 10/2008 |

OTHER PUBLICATIONS

Building Integrated, Infrastructure, and Utility Scale Solar Power. http://www.power-spar.com/Power-Spar/index.phpwww.powerspar.com. Last accessed Aug. 14, 2009, 1 page.

Sater, et al. High Voltage Silicon VMJ Solar Cells for up to 1000 Suns Intensities. Photovoltaic Specialists Conference 2002. Conference Record of the Twenty-Ninth IEEE, May 19-24, 2002, pp. 1019-1022. Last accessed Oct. 1, 2009, 4 pages.

Written Opinion and International Search Report mailed 11/10/09 for PCT Application No. PCT/US 09149610, 25 pp.

OA mailed Oct. 17, 2011 for U.S. Appl. No. 12/495,164, 16 pages.

The Fredericks Company. "Electrolytic Tilt Sensor Selection and Operation" published on the Internet at [http://www.frederickscom.com/sens_tech_select.tpl], retrieved Oct. 8, 2011, 3 pages.

The Fredericks Company. "TrueTILT Wide Range" published on the Internet at [http://www.frederickscom.com/sens_tilt_0717_4304.tpl], retrieved Oct. 8, 2011, 1 page.

The Fredericks Company, "0717-4304-99 TrueTilt, Dual Axis, Wide Angle, Electrolytic Tilt Sensor" published on the Internet at [http://www.frederickscom.com/pdf/0717-4304.pdf], retrieved Oct. 8, 2011, 2 pages.

Australian Office Action mailed Oct. 18, 2011 for AU Application No. 2009266870, 3 pages.

OA dated Dec. 22, 2011 for U.S. Appl. No. 12/496,034, 35 pages.

OA dated Nov. 21, 2011 for U.S. Appl. No. 12/495,398, 30 pages.

OA dated Nov. 4, 2011 for U.S. Appl. No. 12/496,541, 48 pages.

Notice of allowance dated Mar. 23, 2012 for U.S. Appl. No. 12/495,164, 36 pages.

Final Office Action dated Apr. 16, 2012 for U.S. Appl. No. 12/495,398, 36 pages.

Non-Final Office Action dated Mar. 30, 2012 for U.S. Appl. No. 12/495,136, 41 pages.

Final Office Action dated Mar. 1, 2012 for U.S. Appl. No. 12/496,541, 31 pages.

OA dated Aug. 31, 2012 for US Appl. No. 12/495,136, 13 pages.

OA dated Jun. 19, 2012 for US Appl. No. 12/496,541, 26 pages.

OA dated Jun. 28, 2012 for US Appl. No. 12/495,303, 70 pages.

* cited by examiner

SOLAR CONCENTRATOR TESTING

CROSS-REFERENCE TO RELATED APPLICATIONS

This application claims the benefit of U.S. Provisional Patent application Ser. No. 61/078,038 entitled "SOLAR CONCENTRATOR TESTING" and filed Jul. 3, 2008. The entirety of the above-noted application is incorporated by reference herein.

BACKGROUND

Limited supply of fossil energy resources and their associated global environmental damage have compelled market forces to diversify energy resources and related technologies. One such resource that has received significant attention is solar energy, which employs photovoltaic (PV) technology to convert light into electricity. Typically, PV production has been doubling every two years, increasing by an average of 48 percent each year since year 2002, making it the world's fastest-growing energy technology. By midyear 2008, estimates for cumulative global solar energy production capacity stands to at least 12,400 megawatts. Approximately 90% of such generating capacity consists of grid-tied electrical systems, wherein installations can be ground-mounted or built upon roofs or walls of a building, known as Building Integrated Photovoltaic (BIPV).

Moreover, significant technological progress has been achieved in design and production of solar panels, which are further accompanied by increased efficiency and reductions in manufacturing costs. In general, a major cost element involved in establishment of a wide-scale solar energy collection system is the cost of the support structure, which is employed to mount the solar panels of the array in proper position for receiving and converting solar energy. Other complexities in such arrangements involve efficient operations for the PV elements.

The PV elements for converting light to electric energy are often applied as solar cells to power supplies for small power in consumer-oriented products, such as desktop calculators, watches, and the like. Such systems are drawing attention as to their practicality for future alternate power of fossil fuels. In general, PV elements are elements that employ the photo-electromotive force (photovoltage) of the p-n junction, the Schottky junction, or semiconductors, in which the semiconductor of silicon, or the like, absorbs light to generate photocarriers such as electrons and holes, and the photocarriers drift outside due to an internal electric field of the p-n junction part.

One common PV element employs single-crystal silicon and semiconductor processes for production. For example, a crystal growth process prepares a single crystal of silicon valency-controlled in the p-type or in the n-type, wherein such single crystal is subsequently sliced into silicon wafers to achieve desired thicknesses. Furthermore, the p-n junction can be prepared by forming layers of different conduction types, such as diffusion of a valance controller to make the conduction type opposite to that of a wafer.

In addition to consumer-oriented products, solar energy collection systems are employed for a variety of purposes, for example, as utility interactive power systems, power supplies for remote or unmanned sites, and cellular phone switch-site power supplies, among others. An array of energy conversion modules, such as, PV modules, in a solar energy collection system can have a capacity from a few kilowatts to a hundred kilowatts or more, depending upon the number of PV modules, also known as solar panels, used to form the array. The solar panels can be installed wherever there is exposure to the sun for significant portions of the day.

Typically, a solar energy collection system includes an array of solar panels arranged in the form of rows and mounted on a support structure. Such solar panels can be oriented to optimize the solar panel energy output to suit the particular solar energy collection system design requirements. Solar panels can be mounted on a fixed structure, with a fixed orientation and fixed tilt, or can be mounted on a tracking structure that aims the solar panels toward the sun as the sun moves across the sky during the day and as the sun path moves in the sky during the year.

Nonetheless, controlling temperature of the photovoltaic cells remains critical for operation of such systems, and associated scalability remains a challenging task. Common approximations conclude that typically about 0.3% power is lost for every 1° C. rise in the PV cell.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems (and corresponding methodologies) for testing, evaluating, and diagnosing quality of solar concentrator optics. Essentially, the innovation discloses mechanisms for evaluating the performance and quality of a solar collector by way of emission of modulated laser radiation upon (or near) a position of photovoltaic (PV) cells. In one example, this emission would be at (or substantially near) the focus of the parabola of a true parabolic reflector.

The innovation discloses positioning two receivers at two distances from the source (e.g., solar collector or dish). These receivers are employed to collect modulated light which can be compared to standards or other thresholds. In other words, the strength of the received light can be compared to industry standards or some other preprogrammed or inferred value. Accordingly, performance-related conclusions can be drawn from the result of the comparison.

In other aspects, performance of the optics can be adjusted if desired to enhance results observed by the receivers. For instance, mechanical mechanisms (e.g., motor and controller) can be employed to automatically 'tune' or 'fine-tune' the collector (or a subset of the collector) in order to achieve acceptable or desired performance.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Much of the capital cost required to produce solar power is in the silicon for the photovoltaic (PV) cells or photocells. However, now that suitable photovoltaic cells are available that can operate at 1000 suns, this cost can be reduced by concentrating the sunlight on a relatively small area of silicon. To do this successfully, the reflective material (e.g., mirror) must perform very well indeed.

In most applications, this requirement is even more demanding since the concentrator is most often assembled in the field. Thus, the innovation discloses methods and devices (components) that can permit rapid evaluation of the quality of the concentrator optics and also provide diagnostics in the event of unacceptable performance. Additionally, the innovation enables tuning of the concentrator to achieve optimal or acceptable performance standards.

Figure 1:
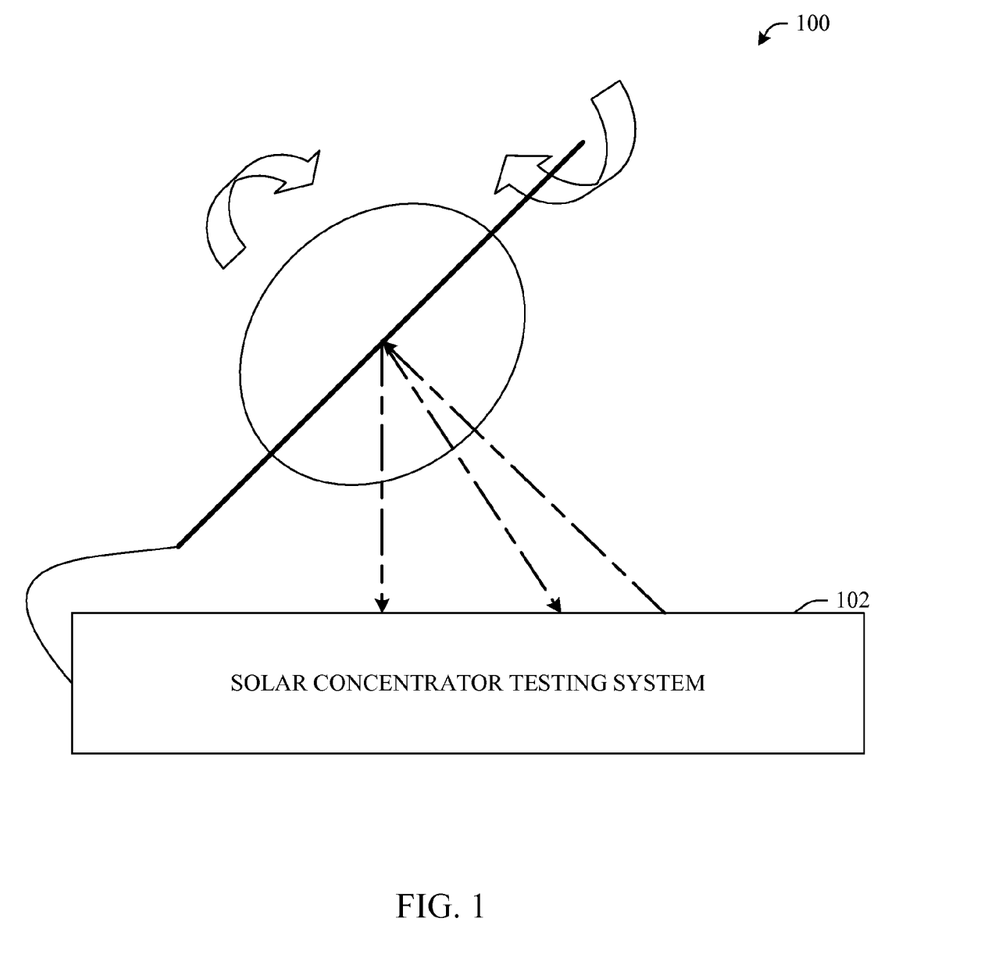
FIG. 1 illustrates an example block diagram of a system that facilitates testing, evaluation and diagnosis of solar collector performance in accordance with an aspect of the innovation.

Referring initially to the drawings, FIG. 1 illustrates a system 100 that employs a solar concentrator testing system 102. In operation, the solar concentrator testing system 102 is capable of assessing or evaluating performance of the solar concentrator, or portion thereof, as illustrated. It is to be understood that the solar concentrator testing system 102 can be employed to assess a single reflector (e.g., parabolic reflector) as well as troughs of reflectors (e.g., arranged parabolicly around the PV cells).

Generally, in aspects, the solar concentrator testing system 102 emits modulated light upon a reflector and employs receivers to measure and evaluate the reflected light. This received modulated light can be compared against standards or other thresholds (e.g., benchmarks, programs) in order to establish if the performance is acceptable or alternatively, if tuning or other modification is required. The features, functions, and benefits of the solar concentrator testing system 102 will be better understood upon a review of FIG. 2 that follows.

Figure 2:
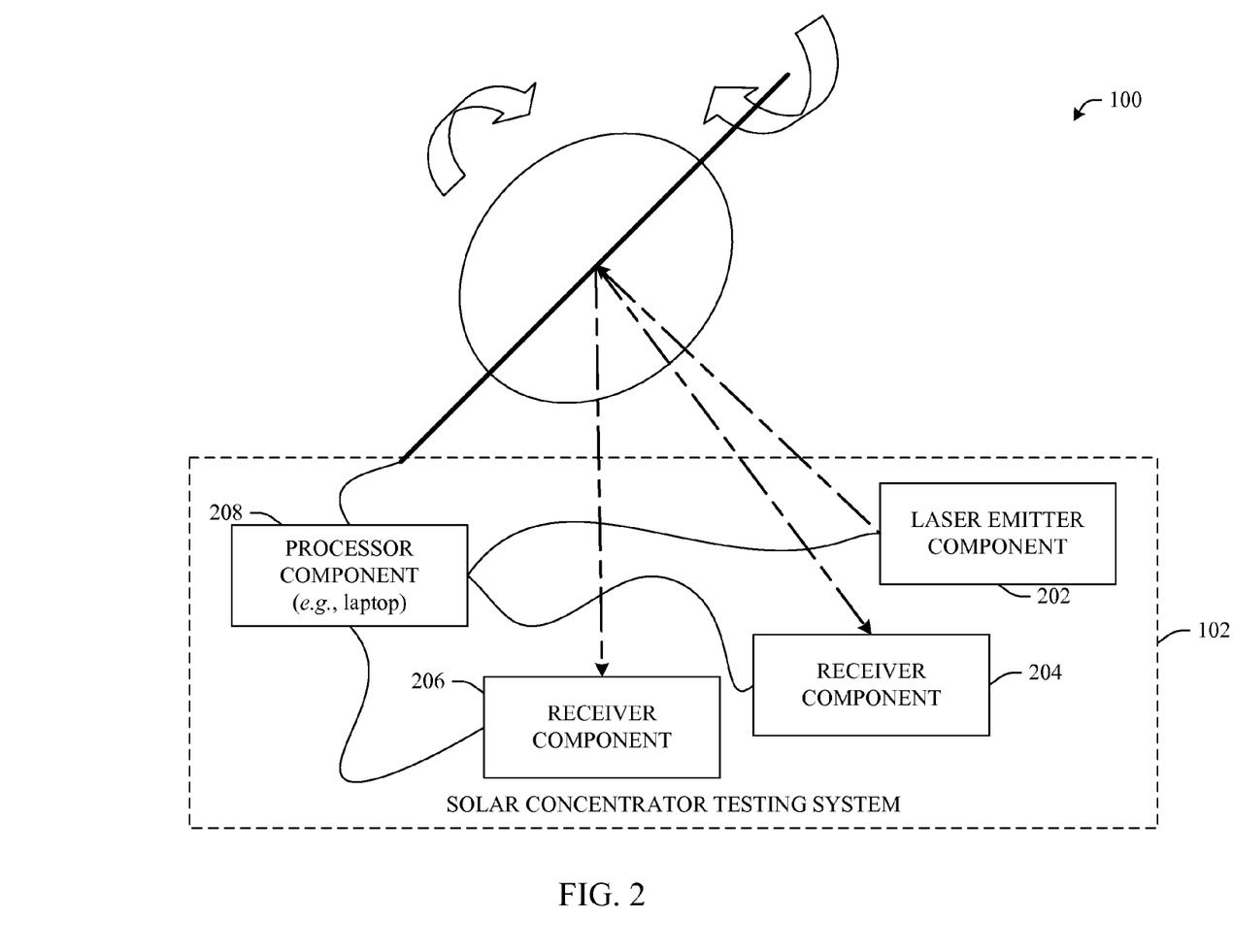
FIG. 2 illustrates an example alternative block diagram of a system that facilitates testing, evaluation and diagnosis of solar collector performance in accordance with an aspect of the innovation.

Referring now to FIG. 2, an alternative block diagram of a solar concentrator testing system 102 is shown. Generally, the solar concentrator testing system 102 can include a laser emitter component 202, receiver components 204, 206 and a processor component 208. Together, these sub-components (202, 204, 206, and 208) facilitate evaluation of solar concentrators.

The laser emitter component 202 is capable of discharging modulated laser radiation near the position where PV cells would be located. For example, in the case of a true parabolic reflector, this position would be at the focus of the parabola. In the case of a trough of reflectors, the position would be at (or near) the centerline focus of the concentrator. In other words, where multiple reflectors are arrange upon a trough in a parabolic shape, the position would be at or near the centerline focus of the collective parabola. It is to be understood that, while a laser emitter component 202 is provided, other aspects can employ other suitable light sources (not shown). These alternative aspects are to be included within the scope of this disclosure and claims appended hereto.

As illustrated, two receivers 204, 206 can be arranged, for example, at different distances from the dish (or reflector). In examples, the receivers can be temporarily attached to the pedestals of two other dishes in an array of solar dishes. Both of the receivers 204, 206 as well as the dish itself can be communicatively coupled to a processor component 208. In one example, the processor component 208 can be a laptop or notebook computing device capable of processing received data and signals. In other examples, the processor component 208 can be a smartphone, pocket computer, personal digital assistant (PDA) or the like.

The processor component 208 can command the dish to scan thereby collecting data associated with the emitted modulated radiation. Similarly, the receivers (204, 206) can collect data associated with the emitted modulated radiation. Subsequently, the processor component 208 can build up two signal strength surfaces at two distances from the dish. These signal strengths can be compared to standard (or otherwise programmed) profiles by which quality of the concentrator collection optics can be determined.

Figure 3:
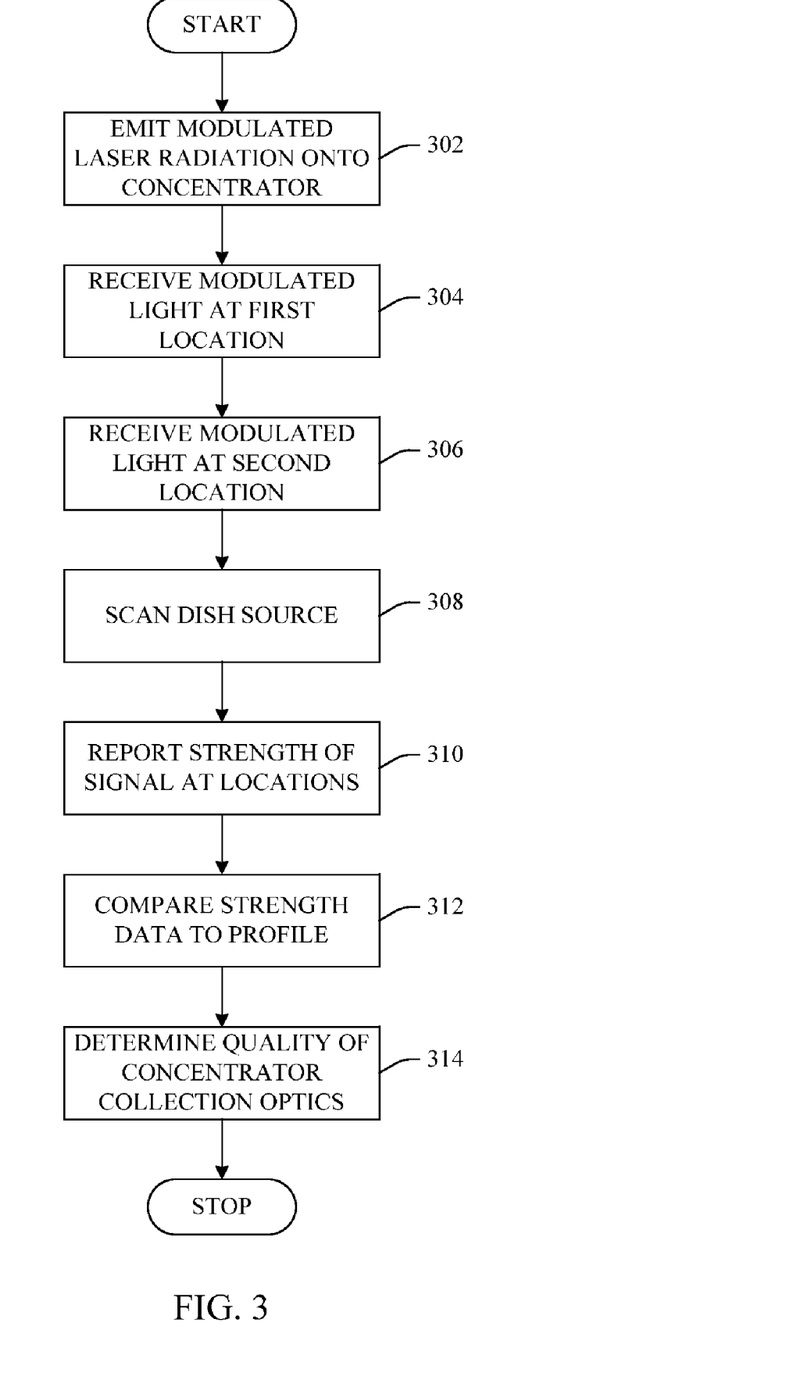
FIG. 3 illustrates an example flow chart of procedures that facilitate testing, evaluating and diagnosing solar collector performance in accordance with an aspect of the innovation.

FIG. 3 illustrates a methodology of testing solar concentrators in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As described above, the innovation employs only simple and compact laser emitters (e.g., 202 of FIG. 2) and detectors (e.g., receivers 204, 206 of FIG. 2) which can be easily located at known positions. Motion can be accomplished by the dish itself using its declination and ascension axis motors to scan the dish back and forth to allow a pattern to be built up in a computer (e.g., processor component 208 of FIG. 2). The use of modulated laser light (e.g., laser emitter component 202 of FIG. 2) can allow the exclusion of ambient sources of light from influencing the test results. Also, it is to be understood that modulation allows sensitive detection of low light levels. Moreover, the testing is essentially automatic and does not require highly trained personnel.

If light is detected where it should not occur, the system (100 of FIGS. 1 and 2) in diagnostic mode can automatically cause the dish to move to the position where this light is detected. By positioning at the detector (e.g., receiver 204, 206 of FIG. 2), the operator can visually see where the light came from, indicating the part of the structure in need of adjustment. Alternatively, automated diagnostics can be performed in order to effect adjustment or tuning.

Referring now to the methodology of FIG. 3, at 302, modulated laser radiation is emitted upon a concentrator. The innovation provides for installing a means or device which emits modulated laser radiation near the position where the photovoltaic cells would normally be located. In one example, for a true parabolic reflector, this would be at the focus of the parabola. In an alternative concentrator arrangement, e.g., where the concentrator is actually a collection of trough reflectors arranged parabolicly around the photovoltaic cells, the laser can be placed at or near the center of the line focus of the concentrator.

Modulated reflected light can be received at two disparate positions or distances from a reflector surface at 304, 306. Here, two receivers optimized for receiving the modulated light can be arranged at two distances from the dish. For example, these receivers can be attached (e.g., temporarily attached) to the pedestals of two other dishes in an array of solar dishes. While aspects described herein employ two receivers (e.g., 204, 206 of FIG. 2), it is to be understood that alternative aspects can employ one or more receivers without departing from the scope of this disclosure and claims appended hereto. As well, while the aspect described positions the detectors (204, 206 of FIG. 2) at disparate distances, it is to be understood that all or a subset of the receivers can be positioned at equal distances. These alternative aspects are to be included within the scope of this disclosure and claims appended hereto.

It is to be understood that the receivers and the dish itself could be in communication with another device, for example, a processor such as a laptop computer. This processor device can command the dish (or concentrators) to scan at 308, while, at 310, the receivers report the strength of signal which they receive from the laser. This allows the laptop computer to build up two signal strength surfaces at two distances from the dish. These signal strength surfaces could be compared to standard profiles at 312 and the quality of the concentrator collection optics could be judged or determined at 314.

As described above, this information can additionally be employed to diagnose and/or adjust the concentrator as desired or appropriate. While these acts are not illustrated in FIG. 3, it is to be understood that these features, functions and benefits are to included within the scope of the innovation and claims appended hereto.

Figure 4:
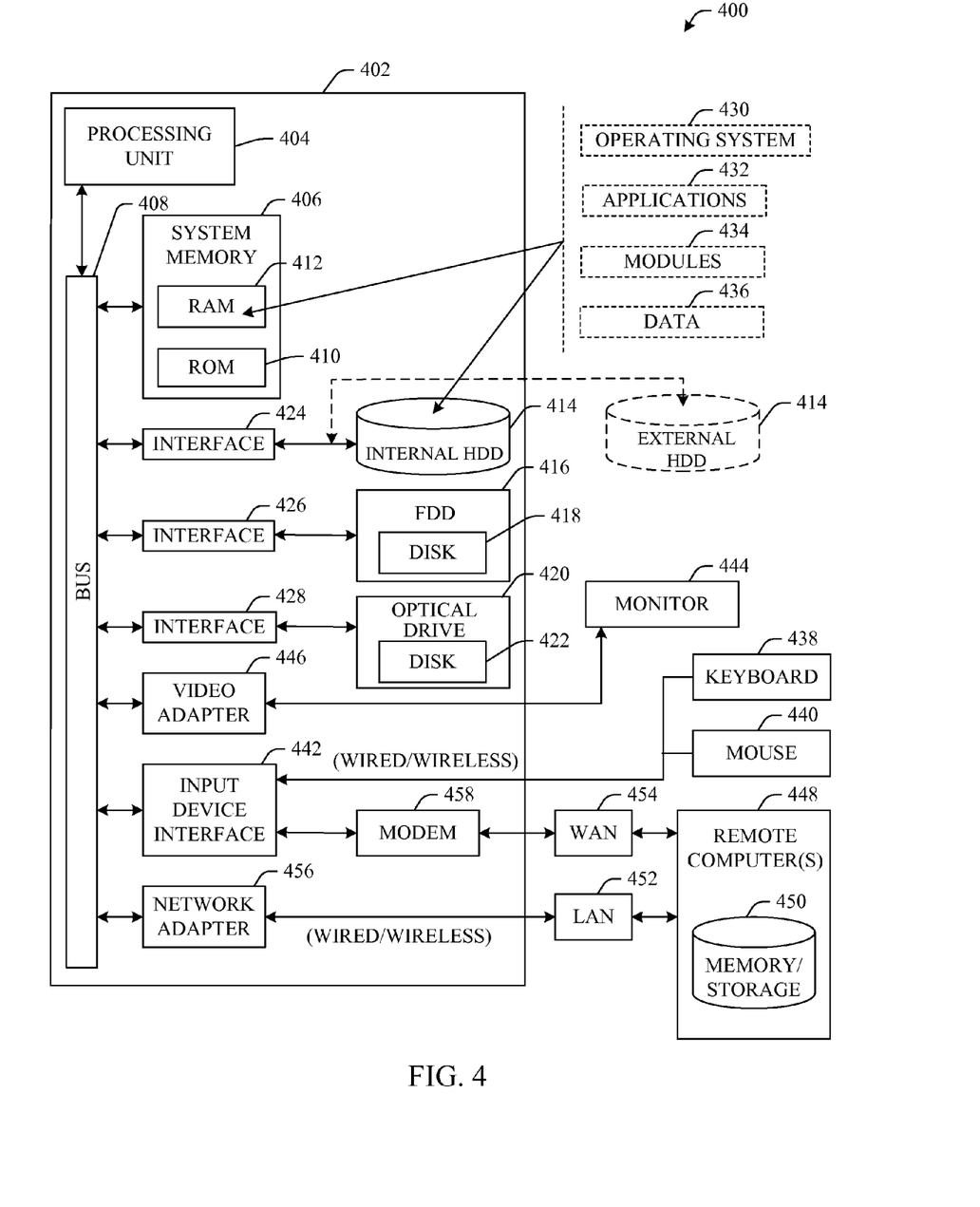
FIG. 4 illustrates a block diagram of a computer operable to execute the disclosed architecture.

Referring now to FIG. 4, there is illustrated a block diagram of a computer operable to execute the disclosed architecture. In order to provide additional context for various aspects of the subject innovation, FIG. 4 and the following discussion are intended to provide a brief, general description of a suitable computing environment 400 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 4, the exemplary environment 400 for implementing various aspects of the innovation includes a computer 402, the computer 402 including a processing unit 404, a system memory 406 and a system bus 408. The system bus 408 couples system components including, but not limited to, the system memory 406 to the processing unit 404. The processing unit 404 can be any of various commercially available processors. Dual microprocessors and other multi-processor architectures may also be employed as the processing unit 404.

The system bus 408 can be any of several types of bus structure that may further interconnect to a memory bus (with or without a memory controller), a peripheral bus, and a local bus using any of a variety of commercially available bus architectures. The system memory 406 includes read-only memory (ROM) 410 and random access memory (RAM) 412. A basic input/output system (BIOS) is stored in a non-volatile memory 410 such as ROM, EPROM, EEPROM, which BIOS contains the basic routines that help to transfer information between elements within the computer 402, such as during start-up. The RAM 412 can also include a high-speed RAM such as static RAM for caching data.

The computer 402 further includes an internal hard disk drive (HDD) 414 (e.g., EIDE, SATA), which internal hard disk drive 414 may also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416 and optical disk drive 420 can be connected to the system bus 408 by a hard disk drive interface 424, a magnetic disk drive interface 426 and an optical drive interface 428, respectively. The interface 424 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 412, including an operating system 430, one or more application programs 432, other program modules 434 and program data 436. All or portions of the operating system, applications, modules, and/or data can also be cached in the RAM 412. It is appreciated that the innovation can be implemented with various commercially available operating systems or combinations of operating systems.

A user can enter commands and information into the computer 402 through one or more wired/wireless input devices, e.g., a keyboard 438 and a pointing device, such as a mouse 440. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected by other interfaces, such as a parallel port, an IEEE 1394 serial port, a game port, a USB port, an IR interface, etc.

A monitor 444 or other type of display device is also connected to the system bus 408 via an interface, such as a video adapter 446. In addition to the monitor 444, a computer typically includes other peripheral output devices (not shown), such as speakers, printers, etc.

The computer 402 may operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically includes many or all of the elements described relative to the computer 402, although, for purposes of brevity, only a memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which may connect to a global communications network, e.g., the Internet.

When used in a LAN networking environment, the computer 402 is connected to the local network 452 through a wired and/or wireless communication network interface or adapter 456. The adapter 456 may facilitate wired or wireless communication to the LAN 452, which may also include a wireless access point disposed thereon for communicating with the wireless adapter 456.

When used in a WAN networking environment, the computer 402 can include a modem 458, or is connected to a communications server on the WAN 454, or has other means for establishing communications over the WAN 454, such as by way of the Internet. The modem 458, which can be internal or external and a wired or wireless device, is connected to the system bus 408 via the serial port interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates testing of solar concentrators, comprising:
   a laser emitter component that emits light upon at least one reflector of a solar concentrator;
   a processor component that causes the solar concentrator to scan;
   a first receiver component that measures light reflected from the at least one reflector; and
   a second receiver component that measures light reflected from the at least one reflector, the first receiver component is located a first distance from the at least one reflector and the second receiver component is located a second distance from the at least one reflector, wherein the processor component compares the reflected light against a standard and determines quality of the at least one reflector based upon the comparison.

2. The system of claim 1, wherein the laser emitter component emits modulated laser radiation.

3. The system of claim 1, wherein the processor component is at least one of a laptop computer, a notebook computer, a desktop computer, a smartphone, a pocket computer, or a personal digital assistant (PDA).

4. The system of claim 1, wherein the processor component builds a first signal strength surface at the first distance and a second signal strength surface at the second distance, wherein the processor component determines the quality of the at least one reflector as a function of the first signal strength surface and the second signal strength surface.

5. The system of claim 1, wherein the first receiver component and the second receiver component are temporarily attached to two other solar collectors in an array of solar collectors.

6. The system of claim 2, wherein the laser emitter component emits the modulated laser radiation near a position where photovoltaic cells are located.

7. The system of claim 6, wherein the solar concentrator comprises a plurality of reflectors arranged as a parabolic reflector and wherein the position where the photovoltaic cells are located is at a focus of a parabola of the parabolic reflector.

8. The system of claim 6, wherein the solar concentrator comprises a plurality of reflectors arranged in a trough configuration and wherein the position of where the photovoltaic cells are located is at, or near, a centerline focus of the solar concentrator.

9. A computer-implemented method of diagnosing quality of solar concentrators, comprising:
   employing a processor that executes computer executable instructions stored on a computer readable storage medium to implement the following acts:
   emitting modulated laser radiation upon a concentrator;
   receiving modulated reflected light at a first location and at a second location;
   instructing the concentrator to scan;
   reporting a first signal strength of the reflected light received at the first location and a second signal strength of the reflected light received at the second location;
   creating two signal strength surfaces from the first signal strength and second signal strength;
   comparing the two signal strength surfaces to a threshold; and
   determining a quality of the concentrator based upon a result of the comparison.

10. The computer-implemented method of claim 9, wherein the threshold is at least one of a pre-programmed value or an inferred value.

11. The computer-implemented method of claim 9, further comprising adjusting a position of the concentrator, wherein the adjustment facilitates enhanced performance of the concentrator.

12. The computer-implemented method of claim 9, wherein the threshold is an industry standard.

13. The computer-implemented method of claim 9, further comprising inferring the threshold based at least in part upon environmental conditions.

14. The computer-implemented method of claim 9, further comprising
   detecting light at a location where the light should not occur;
   causing the concentrator to move to the location where the light should not occur; and
   performing diagnostics to adjust one or more portions of the concentrator as a function of the detecting.

15. A system that facilitates solar concentrator testing, comprising:
   means for emitting light upon a plurality of reflectors in the solar concentrator;
   means for instructing the solar concentrator to scan;
   means for capturing reflected light from at least a subset of the plurality of reflectors; and
   means for assessing a quality of positions of each of the subset of the plurality of reflectors based at least in part upon a signal strength of the reflected light.

16. The system of claim 15, wherein the light is modulated laser light and the plurality of reflectors are arranged as a parabolic reflector and wherein the means for emitting light emits the light toward a focus of a parabola of the parabolic reflector.

17. The system of claim 15, wherein the light is modulated laser light and the plurality of reflectors are arranged in a trough collector arrangement and wherein the means for emitting light emits the light toward a centerline focus of the solar concentrator.

18. The system of claim 15, further comprising means for dynamically adjusting a position of the subset of the plurality of reflectors based at least in part upon the signal strength of the reflected light.

19. The system of claim 15, wherein the means for capturing reflected light is at least two sensors positioned at disparate distances from the solar concentrator.

20. A system that facilitates testing of solar concentrators, comprising:
   a laser emitter component that emits light upon at least one reflector of a solar concentrator;

a processor component that causes the solar concentrator to scan; and at least one receiver component that measures light reflected from the at least one reflector, the processor component compares the reflected light against a standard and determines quality of the at least one reflector based upon the comparison, wherein the laser emitter component emits modulated laser radiation near a position where photovoltaic cells are located, the solar concentrator comprises a plurality of reflectors arranged as a parabolic reflector and wherein the position where the photovoltaic cells are located is at a focus of a parabola of the parabolic reflector.

21. A system that facilitates testing of solar concentrators, comprising:

a laser emitter component that emits light upon at least one reflector of a solar concentrator;

a processor component that causes the solar concentrator to scan; and at least one receiver component that measures light reflected from the at least one reflector, the processor component compares the reflected light against a standard and determines quality of the at least one reflector based upon the comparison, and wherein the laser emitter component emits modulated laser radiation near a position where photovoltaic cells are located, the solar concentrator comprises a plurality of reflectors arranged in a trough configuration and wherein the position of where the photovoltaic cells are located is at, or near, a centerline focus of the solar concentrator.

* * * * *